US008680785B2

(12) United States Patent
Kerstens et al.

(10) Patent No.: US 8,680,785 B2
(45) Date of Patent: Mar. 25, 2014

(54) VARIABLE MASTER CURRENT MIRROR

(71) Applicant: Xicato, Inc., San Jose, CA (US)

(72) Inventors: Pieter Johannes Kerstens, Gilroy, CA (US); Barry Mark Loveridge, San Jose, CA (US)

(73) Assignee: Xicato, Inc., San Jose, CA (US)

( * ) Notice: Subject to any disclaimer, the term of this patent is extended or adjusted under 35 U.S.C. 154(b) by 0 days.

(21) Appl. No.: 13/895,103

(22) Filed: May 15, 2013

(65) Prior Publication Data
US 2013/0249422 A1    Sep. 26, 2013

Related U.S. Application Data

(60) Provisional application No. 61/649,049, filed on May 18, 2012.

(51) Int. Cl.
*G05F 1/00*    (2006.01)
*H05B 37/02*    (2006.01)
*H05B 39/04*    (2006.01)
*H05B 41/36*    (2006.01)
*H05B 37/00*    (2006.01)
*H05B 39/00*    (2006.01)
*H05B 41/00*    (2006.01)
*H05B 39/02*    (2006.01)

(52) U.S. Cl.
USPC .............. 315/297; 315/186; 315/209 R

(58) Field of Classification Search
None
See application file for complete search history.

(56) References Cited

U.S. PATENT DOCUMENTS

| 5,959,316 | A | 9/1999 | Lowery |
| 6,351,069 | B1 | 2/2002 | Lowery et al. |
| 6,504,301 | B1 | 1/2003 | Lowery |
| 6,586,882 | B1 | 7/2003 | Harbers |
| 6,600,175 | B1 | 7/2003 | Baretz et al. |
| 6,680,569 | B2 | 1/2004 | Mueller-Mach et al. |
| 6,812,500 | B2 | 11/2004 | Reeh et al. |
| 7,126,162 | B2 | 10/2006 | Reeh et al. |
| 7,250,715 | B2 | 7/2007 | Mueller et al. |
| 7,479,662 | B2 | 1/2009 | Soules et al. |
| 7,564,180 | B2 | 7/2009 | Brandes |
| 7,614,759 | B2 | 11/2009 | Negley |
| 7,629,621 | B2 | 12/2009 | Reeh et al. |
| 2007/0081336 | A1 | 4/2007 | Bierhuizen et al. |
| 2011/0127921 | A1 | 6/2011 | Lin et al. |
| 2012/0286753 | A1* | 11/2012 | Zhong et al. .................. 323/282 |

FOREIGN PATENT DOCUMENTS

GB    2 254 211 A    9/1992

OTHER PUBLICATIONS

International Search Report and Written Opinion mailed on Aug. 29, 2013 for International Application No. PCT/US2013/041329 filed on May 16, 2013 by Xicato, Inc., 11 pages.

* cited by examiner

*Primary Examiner* — Douglas W Owens
*Assistant Examiner* — Dedei K Hammond
(74) *Attorney, Agent, or Firm* — Silicon Valley Patent Group LLP

(57) ABSTRACT

A variable master current mirror circuit may be used to balance the currents through parallel Light Emitting Diode (LED) strings in an illumination module when the LED string with the largest forward voltage changes due to events, such as a short failure of an LED. The variable master current mirror circuit includes a switching circuit that is coupled to the parallel LED strings and a current mirror circuit that is coupled to the parallel LED strings and the switching circuit. The switching circuit switchably connects the LED string with the largest forward voltage to the current mirror circuit as a master LED string. The current mirror circuit maintains equal currents through the LED strings with reference to the current through the master LED string.

14 Claims, 12 Drawing Sheets

VARIABLE MASTER CURRENT MIRROR

CROSS REFERENCE TO RELATED APPLICATIONS

This application claims priority under 35 USC 119 to U.S. Provisional Application No. 61/649,049, filed May 18, 2012, which is incorporated by reference herein in its entirety.

TECHNICAL FIELD

The described embodiments relate to illumination modules that include Light Emitting Diodes (LEDs), and in particular to a current source used to provide current to LEDs in the illumination device.

BACKGROUND

The use of LEDs in general lighting is becoming more common. LED-based illumination devices are often electrically configured as strings of LEDs in series with the strings arranged in parallel. Thus, multiple LEDs are coupled in series to form an LED string and multiple LED strings are coupled in parallel to a common current source. Without compensation, the current supplied to each LED string depends on the forward voltage characteristic of each LED string. For example, if a first LED string has a significantly lower forward voltage than a second LED string, more current will flow through the first LED string than the second LED string. Consequently, one LED string may be operating below its full light generating potential while another LED string may be operating at current levels that overdrive the LEDs and reduce their lifetime, which is undesireable from the standpoint of efficiency and reliability.

SUMMARY

A variable master current mirror circuit may be used to balance the currents through a parallel Light Emitting Diode (LED) strings in an illumination module when the LED string with the largest forward voltage changes due to events, such as a short failure of an LED. The variable master current mirror circuit includes a switching circuit that is coupled to the parallel LED strings and a current mirror circuit that is coupled to the parallel LED strings and the switching circuit. The switching circuit switchably connects the LED string with the largest forward voltage to the current mirror circuit as a master LED string. The current mirror circuit maintains equal currents through the LED strings with reference to the current through the master LED string. An illumination module includes Light Emitting Diodes (LEDs).

In one aspect, a light emitting diode (LED) based illumination device includes a first LED string including a first plurality of LEDs coupled in series; a second LED string including a second plurality of LEDs coupled in series; a current source coupled to the first LED string and the second LED string; and a variable master current mirror circuit comprising a switching circuit coupled to the first LED string and the second LED string and a current mirror circuit coupled between the switching circuit and the current source, wherein the switching circuit switchably connects the first LED string to the current mirror circuit as a master LED string when the first LED string has a largest forward voltage and connects the second LED string to the current mirror circuit as the master LED string when the second LED string has the largest forward voltage and the current mirror circuit maintains equal currents through the first LED string and the second LED string with reference to a current through the master LED string.

In another aspect, a variable master current mirror circuit includes a first transistor having a drain coupleable to a first LED string, a source and a gate; a second transistor having a drain coupleable to a second LED string, a source coupled to the source of the first transistor, and a gate; a third transistor having a drain coupled to the drain of the first transistor, a source, and a gate coupled to the source of the first transistor; and a fourth transistor having a drain coupled to the drain of the second transistor, a source coupled to the source of the third transistor, and a gate coupled to the source of the first transistor.

In another aspect, a method includes receiving currents from a common current source through a first LED string and a second LED string coupled in parallel with the first LED string; determining if the first LED string has a largest forward voltage or the second LED string has the largest forward voltage; and balancing the currents through the first LED string and the second LED string with reference to a first current through the first LED string when the first LED string has the largest forward voltage and with reference to a second current through the second LED string when the second LED string has the largest forward voltage.

Further details and embodiments and techniques are described in the detailed description below.

DETAILED DESCRIPTION

Reference will now be made in detail to background examples and some embodiments of the invention, examples of which are illustrated in the accompanying drawings.

Figure 1:
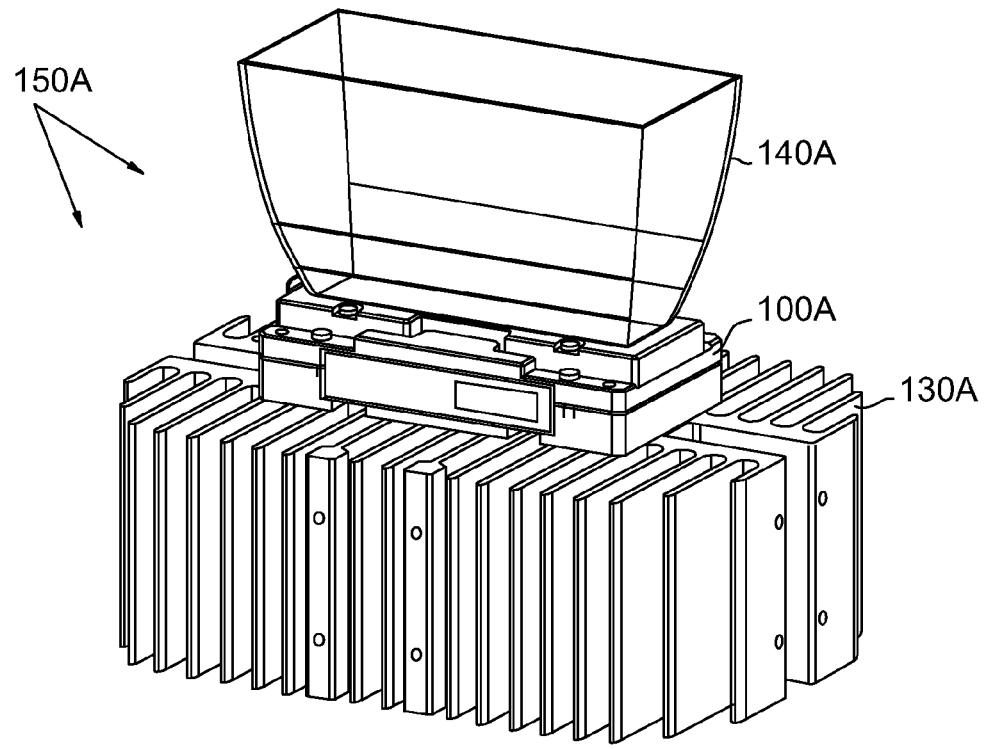
FIGS. 1, 2, and 3 illustrate three exemplary luminaires, including an illumination device, optical element, and light fixture.
Figure 2:
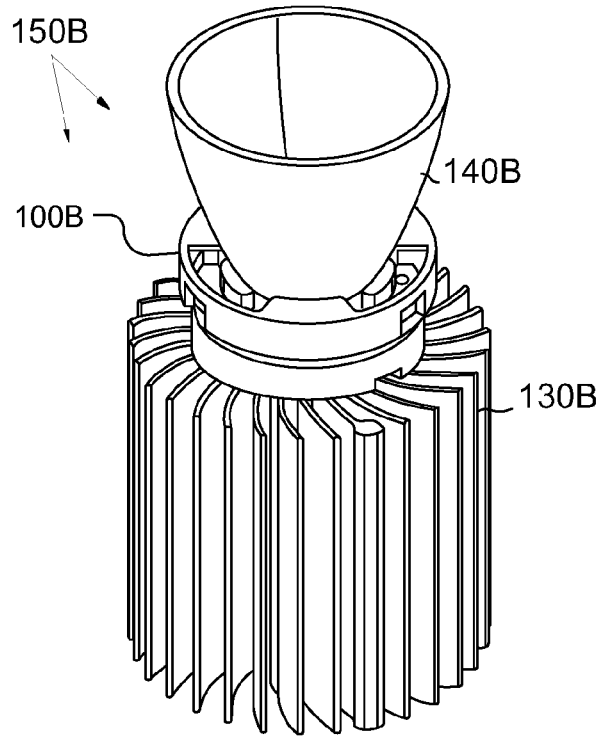
Figure 3:
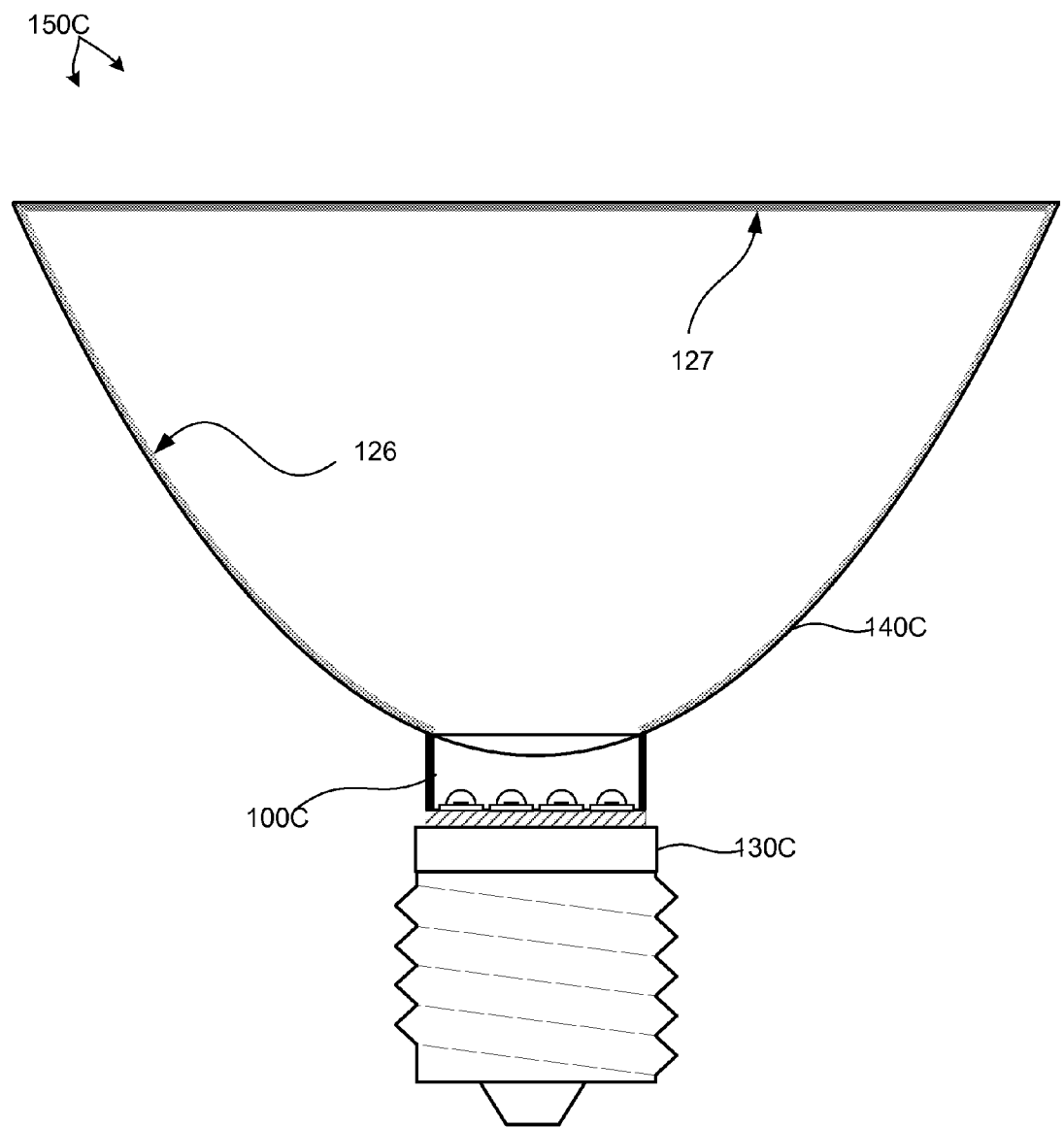

FIGS. 1, 2, and 3 illustrate three exemplary luminaires, respectively labeled 150A, 150B, and 150C (sometimes collectively or generally referred to as luminaire 150). The luminaire 150A illustrated in FIG. 1 includes an illumination module 100A with a rectangular form factor. The luminaire 150B illustrated in FIG. 2 includes an illumination module 100B with a circular form factor. The luminaire 150C illustrated in FIG. 3 includes an illumination module 100C integrated into a retrofit lamp device. These examples are for illustrative purposes. Examples of illumination modules of general polygonal and elliptical shapes may also be contemplated. FIG. 1 illustrates luminaire 150A with an LED based illumination module 100A, reflector 140A, and light fixture 130A. FIG. 2 illustrates luminaire 150B with an LED based illumination module 100B, reflector 140B, and light fixture 130B. FIG. 3 illustrates luminaire 150C with an LED based illumination module 100C, reflector 140C, and light fixture 130C. For the sake of simplicity, LED based illumination module 100A, 100B, and 100C may be collectively referred to as illumination module 100, reflector 140A, 140B, and 140C may be collectively referred to as reflector 140, and light fixture 130A, 130B, and 130C may be collectively referred to as light fixture 130. As depicted, light fixture 130 includes a heat sink capability, and therefore may be sometimes referred to as heat sink 130. However, light fixture 130 may include other structural and decorative elements (not shown). Reflector 140 is mounted to illumination module 100 to collimate or deflect light emitted from illumination module 100. The reflector 140 may be made from a thermally conductive material, such as a material that includes aluminum or copper and may be thermally coupled to illumination module 100. Heat flows by conduction through illumination module 100 and the thermally conductive reflector 140. Heat also flows via thermal convection over the reflector 140. Reflector 140 may be a compound parabolic concentrator, where the concentrator is constructed of or coated with a highly reflecting material. Optical elements, such as a diffuser (not shown) or reflector 140 may be removably coupled to illumination module 100, e.g., by means of threads, a clamp, a twist-lock mechanism, or other appropriate arrangement. As illustrated in FIG. 3, the reflector 140C may include sidewalls 126 and a window 127 that are optionally coated, e.g., with a wavelength converting material, diffusing material or any other desired material.

As depicted in FIGS. 1, 2, and 3, illumination module 100 is mounted to heat sink 130. Heat sink 130 may be made from a thermally conductive material, such as a material that includes aluminum or copper and may be thermally coupled to illumination module 100. Heat flows by conduction through illumination module 100 and the thermally conductive heat sink 130. Heat also flows via thermal convection over heat sink 130. Illumination module 100 may be attached to heat sink 130 by way of screw threads to clamp the illumination module 100 to the heat sink 130. To facilitate easy removal and replacement of illumination module 100, illumination module 100 may be removably coupled to heat sink 130, e.g., by means of a clamp mechanism, a twist-lock mechanism, or other appropriate arrangement. Illumination module 100 includes at least one thermally conductive surface that is thermally coupled to heat sink 130, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heatsink contact area should be used. Using a larger heat sink 130 may permit the LEDs 102 to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the illumination module 100.

Figure 4:
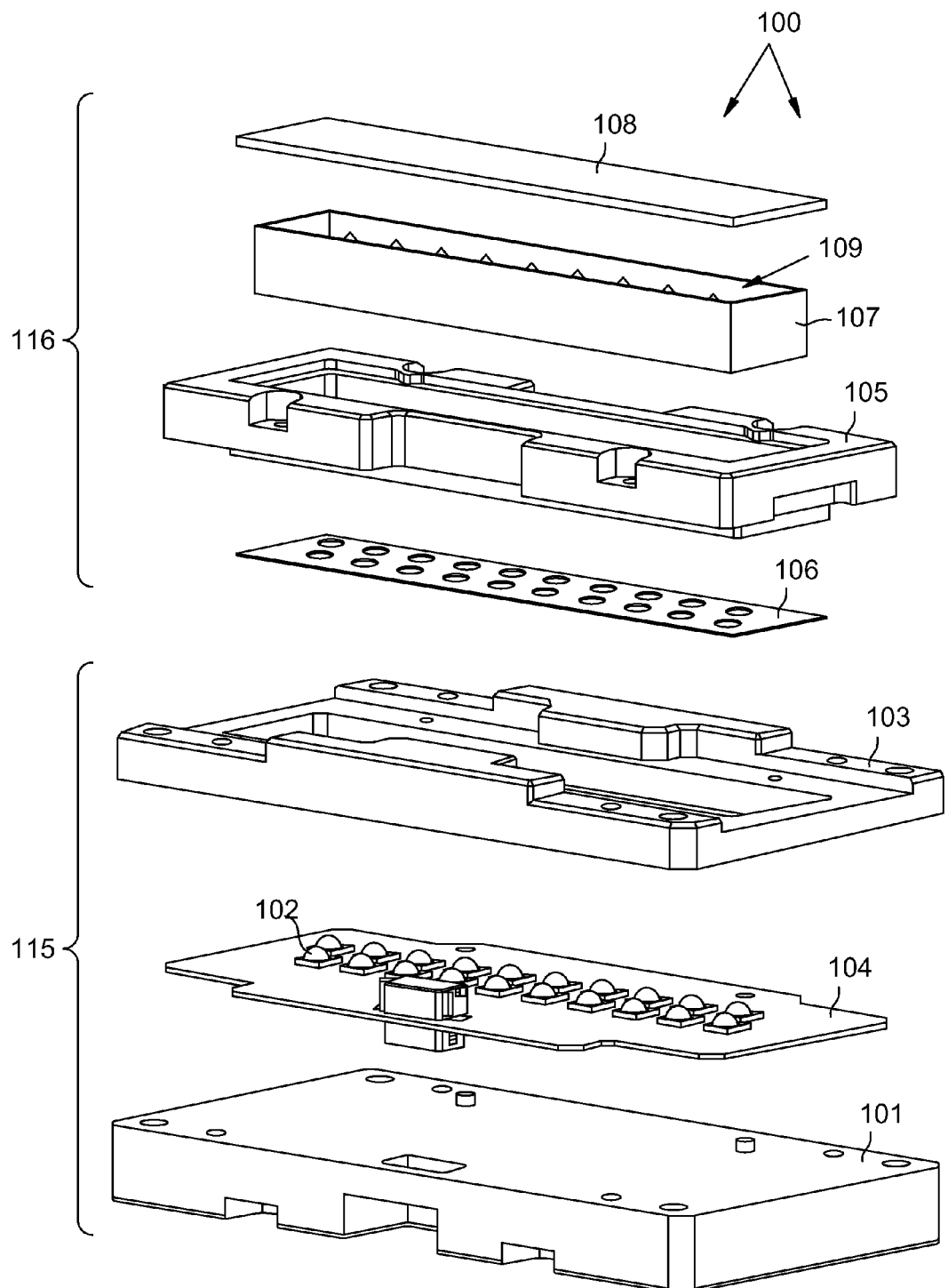
FIG. 4 illustrates an exploded view of components of an LED based illumination module.

FIG. 4 illustrates an exploded view of components of LED based illumination module 100 as depicted in FIG. 1 by way of example. It should be understood that as defined herein an LED based illumination module is not an LED, but is an LED light source or fixture or component part of an LED light source or fixture. For example, an LED based illumination module may be an LED based replacement lamp such as depicted in FIG. 3. LED based illumination module 100 includes one or more LED die or packaged LEDs and a mounting board to which LED die or packaged LEDs are attached. In one embodiment, the LEDs 102 are packaged LEDs, such as the Luxeon Rebel manufactured by Philips Lumileds Lighting. Other types of packaged LEDs may also be used, such as those manufactured by OSRAM (Oslon package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LED chip typically has a size about 1 mm by 1 mm by 0.5 mm, but these dimensions may vary. In some embodiments, the LEDs 102 may include multiple chips. The multiple chips can emit light of similar or different colors, e.g., red, green, and blue. Mounting board 104 is attached to mounting base 101 and secured in position by mounting board retaining ring 103. Together, mounting board 104 populated by LEDs 102 and mounting board retaining ring 103 comprise light source sub-assembly 115. Light source sub-assembly 115 is operable to convert electrical energy into light using LEDs 102. The light emitted from light source sub-assembly 115 is directed to light conversion sub-assembly 116 for color mixing and color conversion. Light conversion sub-assembly 116 includes cavity body 105 and an output port, which is illustrated as, but is not limited to, an output window 108. Light conversion sub-assembly 116 may include a bottom reflector 106 and sidewall 107, which may optionally be formed from inserts. Output window 108, if used as the output port, is fixed to the top of cavity body 105. In some embodiments, output window 108 may be fixed to cavity body 105 by an adhesive. To promote heat dissipation from the output window to cavity body 105, a thermally conductive adhesive is desirable. The adhesive should reliably withstand the temperature present at the interface of the output window 108 and cavity body 105. Furthermore, it is preferable that the adhesive either reflect or transmit as much incident light as possible, rather than absorbing light emitted from output window 108. In one example, the combination of heat tolerance, thermal conductivity, and optical properties of one of several adhesives manufactured by Dow Corning (USA) (e.g., Dow Corning model number SE4420, SE4422, SE4486, 1-4173, or SE9210), provides suitable performance. However, other thermally conductive adhesives may also be considered.

Either the interior sidewalls of cavity body 105 or sidewall insert 107, when optionally placed inside cavity body 105, is reflective so that light from LEDs 102, as well as any wavelength converted light, is reflected within the cavity 160 until it is transmitted through the output port, e.g., output window 108 when mounted over light source sub-assembly 115. Bottom reflector insert 106 may optionally be placed over mounting board 104. Bottom reflector insert 106 includes holes such that the light emitting portion of each LED 102 is not blocked by bottom reflector insert 106. Sidewall insert 107 may optionally be placed inside cavity body 105 such that the interior surfaces of sidewall insert 107 direct light from the LEDs 102 to the output window when cavity body 105 is mounted over light source sub-assembly 115. Although as depicted, the interior sidewalls of cavity body 105 are rectangular in shape as viewed from the top of illumination module 100, other shapes may be contemplated (e.g., clover shaped or polygonal). In addition, the interior sidewalls of cavity body 105 may taper or curve outward from mounting board 104 to output window 108, rather than perpendicular to output window 108 as depicted.

Bottom reflector insert 106 and sidewall insert 107 may be highly reflective so that light reflecting downward in the cavity 160 is reflected back generally towards the output port, e.g., output window 108. Additionally, inserts 106 and 107 may have a high thermal conductivity, such that it acts as an additional heat spreader. By way of example, the inserts 106 and 107 may be made with a highly thermally conductive material, such as an aluminum based material that is processed to make the material highly reflective and durable. By way of example, a material referred to as Miro®, manufactured by Alanod, a German company, may be used. High reflectivity may be achieved by polishing the aluminum, or by covering the inside surface of inserts 106 and 107 with one or more reflective coatings. Inserts 106 and 107 might alternatively be made from a highly reflective thin material, such as Vikuiti™ ESR, as sold by 3M (USA), Lumirror™ E60L manufactured by Toray (Japan), or microcrystalline polyethylene terephthalate (MCPET) such as that manufactured by Furukawa Electric Co. Ltd. (Japan). In other examples, inserts 106 and 107 may be made from a polytetrafluoroethylene (PTFE) material. In some examples inserts 106 and 107 may be made from a PTFE material of one to two millimeters thick, as sold by W. L. Gore (USA) and Berghof (Germany). In yet other embodiments, inserts 106 and 107 may be constructed from a PTFE material backed by a thin reflective layer such as a metallic layer or a non-metallic layer such as ESR, E60L, or MCPET. Also, highly diffuse reflective coatings can be applied to any of sidewall insert 107, bottom reflector insert 106, output window 108, cavity body 105, and mounting board 104. Such coatings may include titanium dioxide ($TiO_2$), zinc oxide ($ZnO$), and barium sulfate ($BaSO_4$) particles, or a combination of these materials.

Figure 5A:
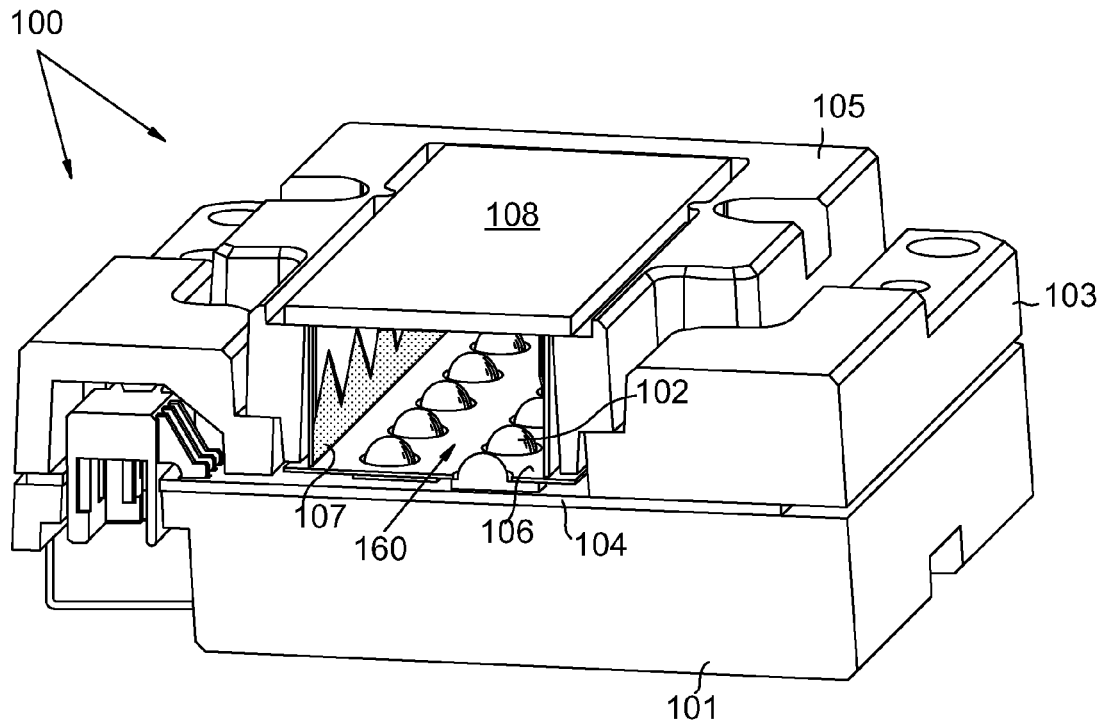
FIGS. 5A and 5B illustrate perspective and cross-sectional views of an LED based illumination module.
Figure 5B:
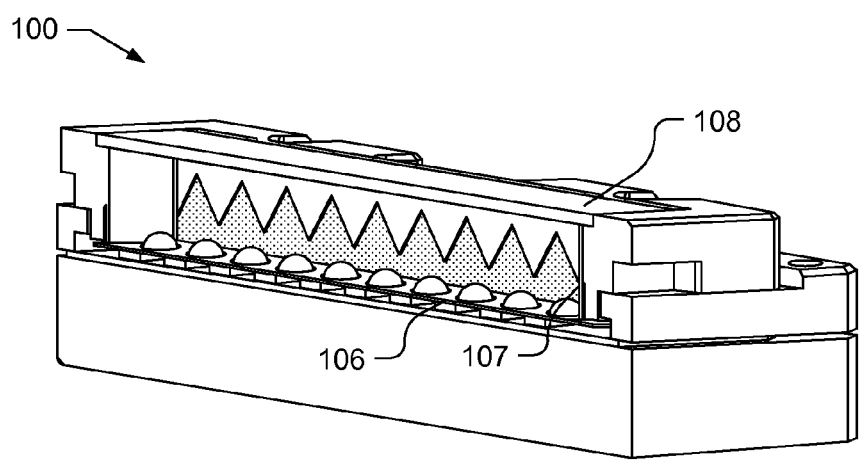

FIGS. 5A and 5B illustrate perspective, cross-sectional views of LED based illumination module 100 as depicted in FIG. 1. In this embodiment, the sidewall insert 107, output window 108, and bottom reflector insert 106 disposed on mounting board 104 define a color conversion cavity 160 (illustrated in FIG. 5A) in the LED based illumination module 100. A portion of light from the LEDs 102 is reflected within color conversion cavity 160 until it exits through output window 108. Reflecting the light within the cavity 160 prior to exiting the output window 108 has the effect of mixing the light and providing a more uniform distribution of the light that is emitted from the LED based illumination module 100. In addition, as light reflects within the cavity 160 prior to exiting the output window 108, an amount of light is color converted by interaction with a wavelength converting material included in the cavity 160.

LEDs 102 can emit different or the same colors, either by direct emission or by phosphor conversion, e.g., where phosphor layers are applied to the LEDs as part of the LED package. The illumination device 100 may use any combination of colored LEDs 102, such as red, green, blue, amber, or cyan, or the LEDs 102 may all produce the same color light. Some or all of the LEDs 102 may produce white light. In addition, the LEDs 102 may emit polarized light or non-polarized light and LED based illumination device 100 may use any combination of polarized or non-polarized LEDs. In some embodiments, LEDs 102 emit either blue or UV light because of the efficiency of LEDs emitting in these wavelength ranges. The light emitted from the illumination device 100 has a desired color when LEDs 102 are used in combination with wavelength converting materials included in color conversion cavity 160. The photo converting properties of the wavelength converting materials in combination with the mixing of light within cavity 160 results in a color converted light output. By tuning the chemical properties and/or physical properties (such as thickness or concentration) of the wavelength converting materials and the geometric properties of the coatings on the interior surfaces of cavity 160, specific color properties of light output by output window 108 may be specified, e.g. color point, color temperature, and color rendering index (CRI).

For purposes of this patent document, a wavelength converting material is any single chemical compound or mixture of different chemical compounds that performs a color conversion function, e.g., absorbs an amount of light of one peak wavelength, and in response, emits an amount of light at another peak wavelength.

Portions of cavity 160, such as the bottom reflector insert 106, sidewall insert 107, cavity body 105, output window 108, and other components placed inside the cavity (not shown) may be coated with or include a wavelength converting material. FIG. 5B illustrates portions of the sidewall insert 107 coated with a wavelength converting material. Furthermore, different components of cavity 160 may be coated with the same or a different wavelength converting material.

By way of example, phosphors may be chosen from the set denoted by the following chemical formulas: $Y_3Al_5O_{12}:Ce$, (also known as YAG:Ce, or simply YAG) $(Y,Gd)_3Al_5O_{12}:Ce$, $CaS:Eu$, $SrS:Eu$, $SrGa_2S_4:Eu$, $Ca_3(Sc,Mg)_2Si_3O_{12}:Ce$, $Ca_3Sc_2Si_3O_{12}:Ce$, $Ca_3Sc_2O_4:Ce$, $Ba_3Si_6O_{12}N_2:Eu$, $(Sr,Ca)AlSiN_3:Eu$, $CaAlSiN_3:Eu$, $CaAlSi(ON)_3:Eu$, $Ba_2SiO_4:Eu$, $Sr_2SiO_4:Eu$, $Ca_2SiO_4:Eu$, $CaSc_2O_4:Ce$, $CaSi_2O_2N_2:Eu$, $SrSi_2O_2N_2:Eu$, $BaSi_2O_2N_2:Eu$, $Ca_5(PO_4)_3Cl:Eu$, $Ba_5(PO_4)_3Cl:Eu$, $Cs_2CaP_2O_7$, $Cs_2SrP_2O_7$, $Lu_3Al_5O_{12}:Ce$, $Ca_8Mg(SiO_4)_4Cl_2:Eu$, $Sr_8Mg(SiO_4)_4Cl_2:Eu$, $La_3Si_6N_{11}:Ce$, $Y_3Ga_5O_{12}:Ce$, $Gd_3Ga_5O_{12}:Ce$, $Tb_3Al_5O_{12}:Ce$, $Tb_3Ga_5O_{12}:Ce$, and $Lu_3Ga_5O_{12}:Ce$.

In one example, the adjustment of color point of the illumination device may be accomplished by replacing sidewall insert 107 and/or the output window 108, which similarly may be coated or impregnated with one or more wavelength converting materials. In one embodiment a red emitting phosphor such as a europium activated alkaline earth silicon nitride (e.g. $(Sr,Ca)AlSiN3:Eu$) covers a portion of sidewall insert 107 and bottom reflector insert 106 at the bottom of the cavity 160, and a YAG phosphor covers a portion of the output window 108. In another embodiment, a red emitting phosphor such as alkaline earth oxy silicon nitride covers a portion of sidewall insert 107 and bottom reflector insert 106 at the bottom of the cavity 160, and a blend of a red emitting alkaline earth oxy silicon nitride and a yellow emitting YAG phosphor covers a portion of the output window 108.

In some embodiments, the phosphors are mixed in a suitable solvent medium with a binder and, optionally, a surfactant and a plasticizer. The resulting mixture is deposited by any of spraying, screen printing, blade coating, or other suitable means. By choosing the shape and height of the sidewalls that define the cavity, and selecting which of the parts in the cavity will be covered with phosphor or not, and by optimization of the layer thickness and concentration of the phosphor layer on the surfaces of color conversion cavity 160, the color point of the light emitted from the module can be tuned as desired.

In one example, a single type of wavelength converting material may be patterned on the sidewall, which may be, e.g., the sidewall insert 107 shown in FIG. 5B. By way of example, a red phosphor may be patterned on different areas of the sidewall insert 107 and a yellow phosphor may cover the output window 108. The coverage and/or concentrations of the phosphors may be varied to produce different color temperatures. It should be understood that the coverage area of the red and/or the concentrations of the red and yellow phosphors will need to vary to produce the desired color temperatures if the light produced by the LEDs 102 varies. The color performance of the LEDs 102, red phosphor on the sidewall insert 107 and the yellow phosphor on the output window 108 may be measured before assembly and selected based on performance so that the assembled pieces produce the desired color temperature.

LED-based illumination devices are often electrically configured as multiple series strings of LEDs arranged in parallel. In this manner, multiple LEDs are coupled in series to form a LED string and multiple LED strings are coupled in parallel to a common current source. Without compensation, the current supplied to each LED string depends on the forward voltage characteristic of each LED string. For example, if a first LED string has a significantly lower forward voltage than a second LED string, more current will flow through the first LED string than the second LED string. This is undesireable from the standpoint of efficiency and reliability as one LED string may be operating below its full light generating potential while another may be operating at current levels that overdrive the LEDs and reduce their lifetime. To balance current flows among multiple LED strings without compensation requires matching the forward voltages of each LED string. In practice, this may be difficult to achieve in a volume production setting.

One solution to the problem of current imbalance among multiple LEDs strings with different forward voltage characteristics is to independently control current flow through each LED string by attaching each LED string to a separately controlled current source. In some solutions, a common voltage may be supplied to each LED string, but the current through each LED string is independently controlled as a distinct current source. An example of such a solution is the MAX8790A LED driver manufactured by Maxim Integrated Products, Inc., Sunnyvale, Calif. (USA).

To minimize system complexity and cost, multiple, parallel connected LED strings are driven from a common current source rather than implementing separate current sources for each LED string. A solution to the problem of current imbalance among multiple LEDs strings with different forward voltage characteristics driven from a common current source is to implement a variable master current mirror circuit as described herein. Conventional current mirror circuits are configured to replicate a reference current flow. In the context of multiple LED strings the current flow through a "master" LED string circuit is replicated by at least one "slave" LED string. This balances current flow among LED strings. However, in the event of a short failure of an LED in the "master" LED string, the forward voltage of the "master" LED string decreases. Without a constant current source, current flow through the "master" is increased and current supplied to the other parallel connected "slave" LED strings is increased to match the increased current flow through the "master" LED string. With a constant current source, current flow to both LED strings is decreased, and in some cases, current flow remains balanced. However, in cases of multiple LED failures in the "master" LED string, the conventional current mirror configuration may fail to balance current flow through "master" and "slave" LED strings.

In one aspect, a variable master current mirror circuit is introduced that balances current supplied to parallel connected LED strings with reference to the LED string with the largest forward voltage characteristic. In this manner, a short failure event of an LED in any of the LED strings does not result in overdriving other LEDs.

Figure 6:
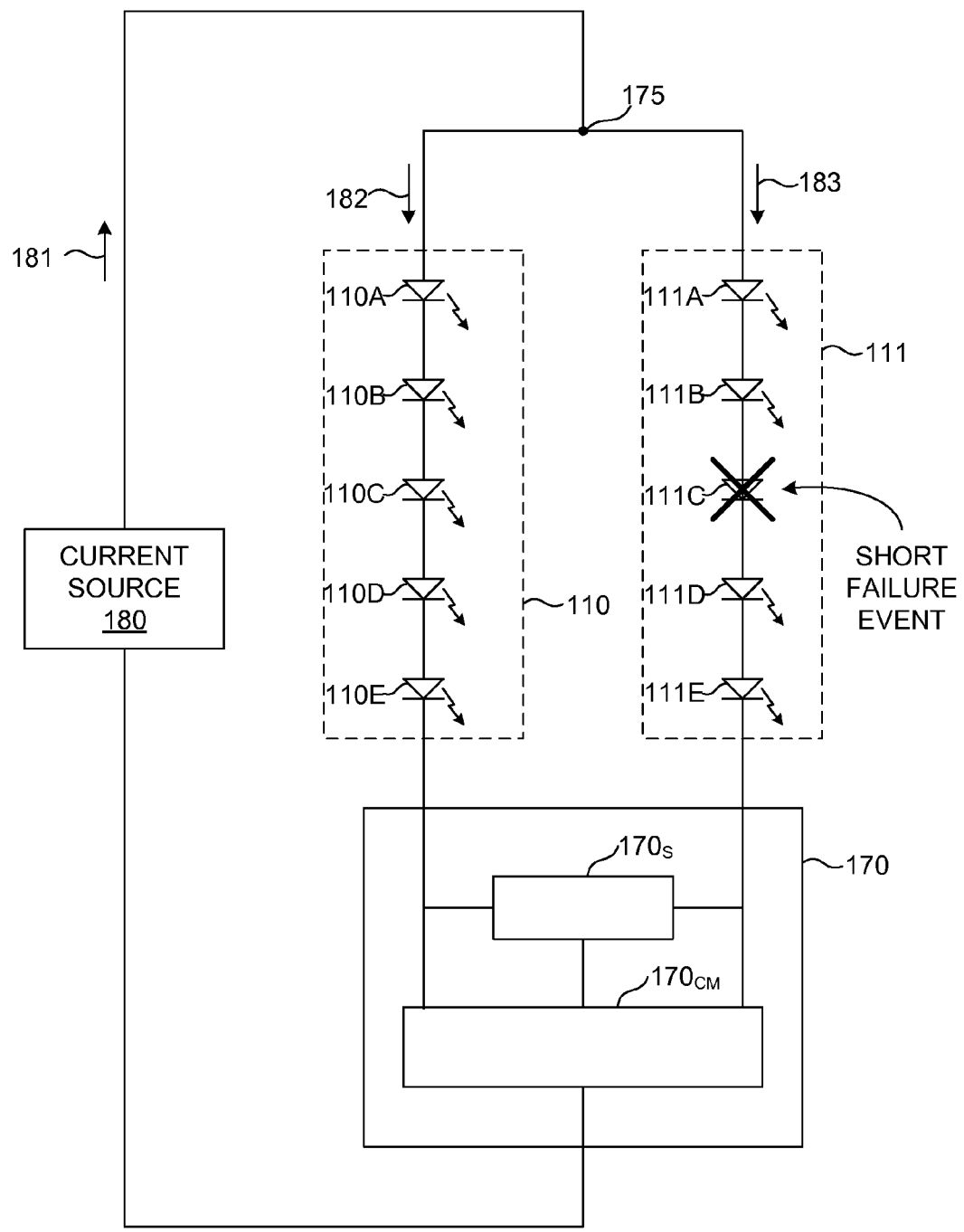
FIG. 6 illustrates a variable master current mirror circuit coupled to parallel LED strings and a current source.

FIG. 6 illustrates a current source 180 and a variable master current mirror circuit 170 coupled to a first LED string 110, including LEDs 110A, 110B, 110C, 110D, and 110E, and a second LED string 111, including LEDs 111A, 111B, 111C, 111D, and 111E. The LED strings 110 and 111 are coupled together at node 175, which is coupled to receive current 181 from the current source 180. In addition, current source 180 is coupled to variable master current mirror circuit 170. The variable master current mirror circuit 170 includes a switching circuit $170_S$ and a current mirror circuit $170_{CM}$ both of which are coupled to the LED strings 110 and 111. The switching circuit $170_S$ is connected to the current mirror circuit $170_{CM}$ to switchably connect LED string 110 to the current mirror circuit as a master LED string when the LED string 110 has forward voltage that is larger than the LED string 111 and connect the LED string 111 to the current mirror circuit $170_{CM}$ as the master LED string when the LED string 111 has a forward voltage that is larger than the LED string 110. The current mirror circuit $170_{CM}$ maintains equal currents through the LED strings 110 and 111 with reference to the current through the master LED string.

In operation variable master current mirror circuit 170 balances current 182 through LED string 110 and current 183 through LED string 111. In one operational example, the forward voltage of LED string 110 is initially smaller than the forward voltage of LED string 111. In this scenario, variable master current mirror circuit 170 treats LED string 111 as the "master." Variable master current mirror circuit 170 mirrors the current flow 183 through LED string 111 by matching current flow 182 through LED string 110 to equal current flow 183. At some point in time, a short failure event occurs in LED 111C. After this event, the forward voltage of LED string 111 becomes less than the forward voltage of LED string 110. In response, variable master current mirror circuit 170 treats LED string 110 as the "master." Variable master current mirror circuit 170 mirrors the current flow 182 through LED string 110 by matching current flow 183 through LED string 111 to equal current flow 182. In this manner, a surge in current flow through both LED strings 110 and 111 is avoided after the short failure event of LED 111C.

Figure 7:
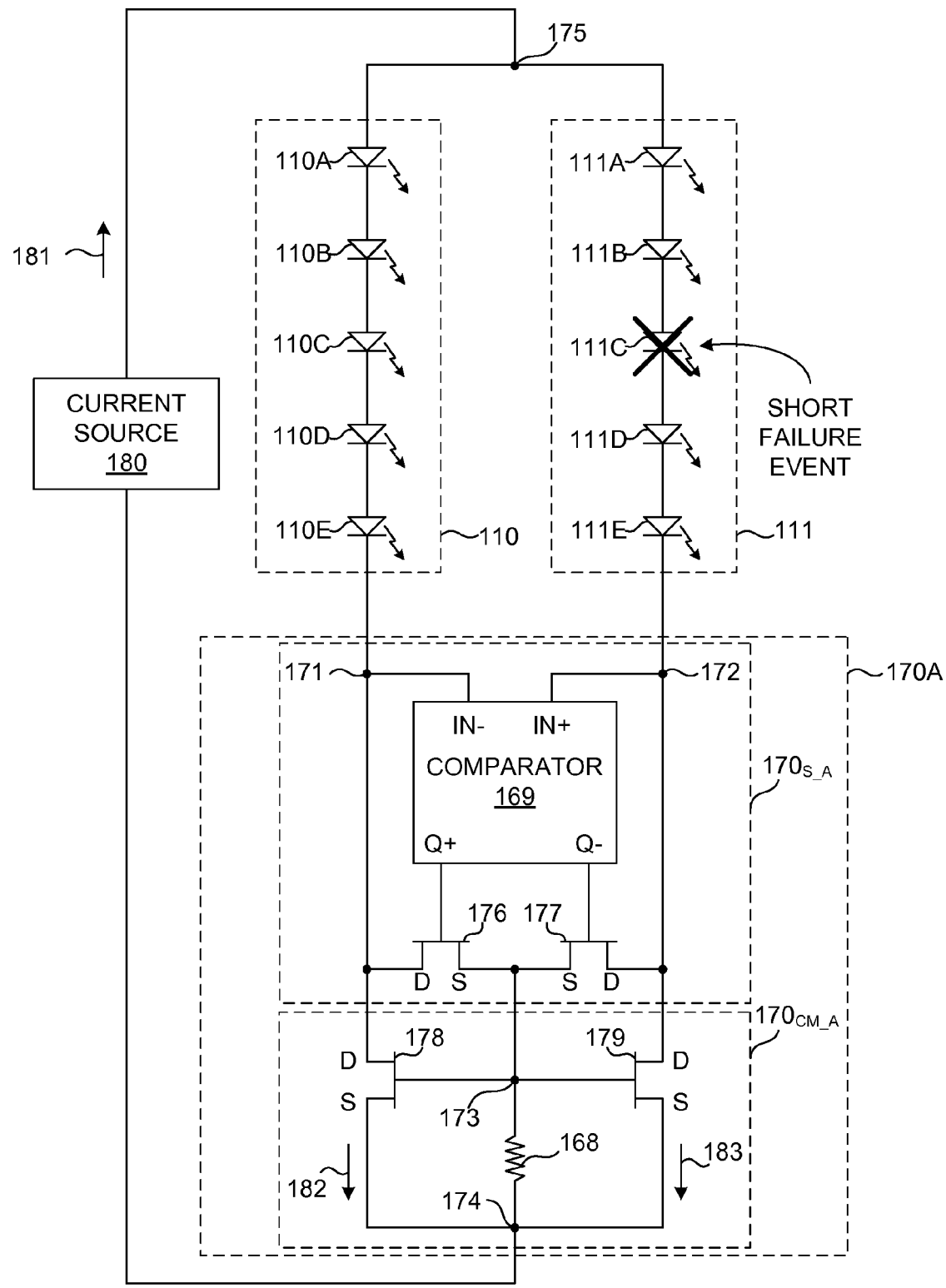
FIG. 7 illustrates an embodiment of the variable master current mirror circuit.

FIG. 7 illustrates one embodiment of the variable master current mirror circuit 170A with a switching circuit $170_{S\_A}$ and a current mirror circuit $170_{CM\_A}$. As illustrated in FIG. 7, variable master current mirror circuit 170A includes n-channel transistors 176-179 and comparator 169 in the switching circuit $170_S$ A. Comparator 169 includes two input nodes: an input node IN+ and an inverting input node IN−, which are coupled to nodes 172 and 171, respectively. Comparator 169 includes two output nodes: an output node Q+ and an inverting output node Q−. Transistor 176 includes a drain coupled to node 171, a source coupled to node 173, and a gate coupled to output Q+ of comparator 169. Transistor 177 includes a drain coupled to node 172, a source coupled to node 173 and a gate coupled to output Q− of comparator 169. The current mirror circuit $170_{CM\_A}$ includes a transistor 178 with a drain coupled to node 171, a source coupled to node 174, and a gate coupled to node 173 and a transistor 179 with a drain coupled to node 172, a source coupled to node 174, and a gate coupled to node 173. A resistor 168 may be coupled to nodes 173 and 174. Resistor 168 is optional and in some embodiments, resistor 168 may be omitted. Resistor 168 may have high resistance (e.g., ten megaohms) and is included to allow a small amount of current flow through variable master current mirror circuit 170A to smooth circuit start-up. Transistors 178 and 179 are "matched" transistors to ensure proper operation of the current mirror circuit. Suitable "matched" transistors are widely available commercially from semiconductor component vendors such as Texas Instruments (USA). Transistors 178 and 179 should be thermally coupled to one another to ensure operation at the same temperature. In some embodiments, transistors 178 and 179 are packaged together and in some embodiments, transistors 178 and 179 are interleaved to ensure that both transistors operate in the same thermal environment. In addition to being thermally coupled, transistors 178 and 179 exhibit very similar electrical properties (e.g., base-emitter voltage and current gain).

In operation, comparator 169 determines a voltage difference between a voltage at node 171 and node 172. The voltage difference is indicative of which LED string has the larger forward voltage characteristic. For example if the voltage at node 172 is greater than the voltage at node 171, this would indicate that the forward voltage across LED string 111 is less than the forward voltage across LED string 110 since both LED string 110 and 111 are coupled together at node 175. Based on the voltage difference between nodes 171 and 172, comparator 169 generates the output Q+ and output Q− coupled to the gates of transistors 176 and 177, respectively. In one example, comparator 169 determines that the voltage at node 172 exceeds the voltage at node 171. Based on this determination, comparator 169 generates a high voltage (i.e., voltage near the positive rail) at output Q+. In response, transistor 176 becomes substantially conductive, effectively coupling voltage node 171 to voltage node 173 and making LED string 110 the "master." In addition, comparator 169 generates a low voltage (i.e., voltage near the negative rail) at the output Q−. In response, transistor 177 becomes substantially non-conductive, effectively decoupling voltage node 172 from node 173 and ensuring that LED string 111 is not the "master." Transistors 178 and 179 are configured in a current mirror configuration with LED string 111 as "master" when node 173 is coupled to node 172 and with LED string 110 as "master" when node 173 is coupled to node 171. In this manner, the voltage difference detected by comparator 169 determines which LED string acts as the "master." Furthermore, variable master current mirror circuit 170A is configured such that the LED string with the larger forward voltage characteristic is always selected as the "master."

Figure 8:
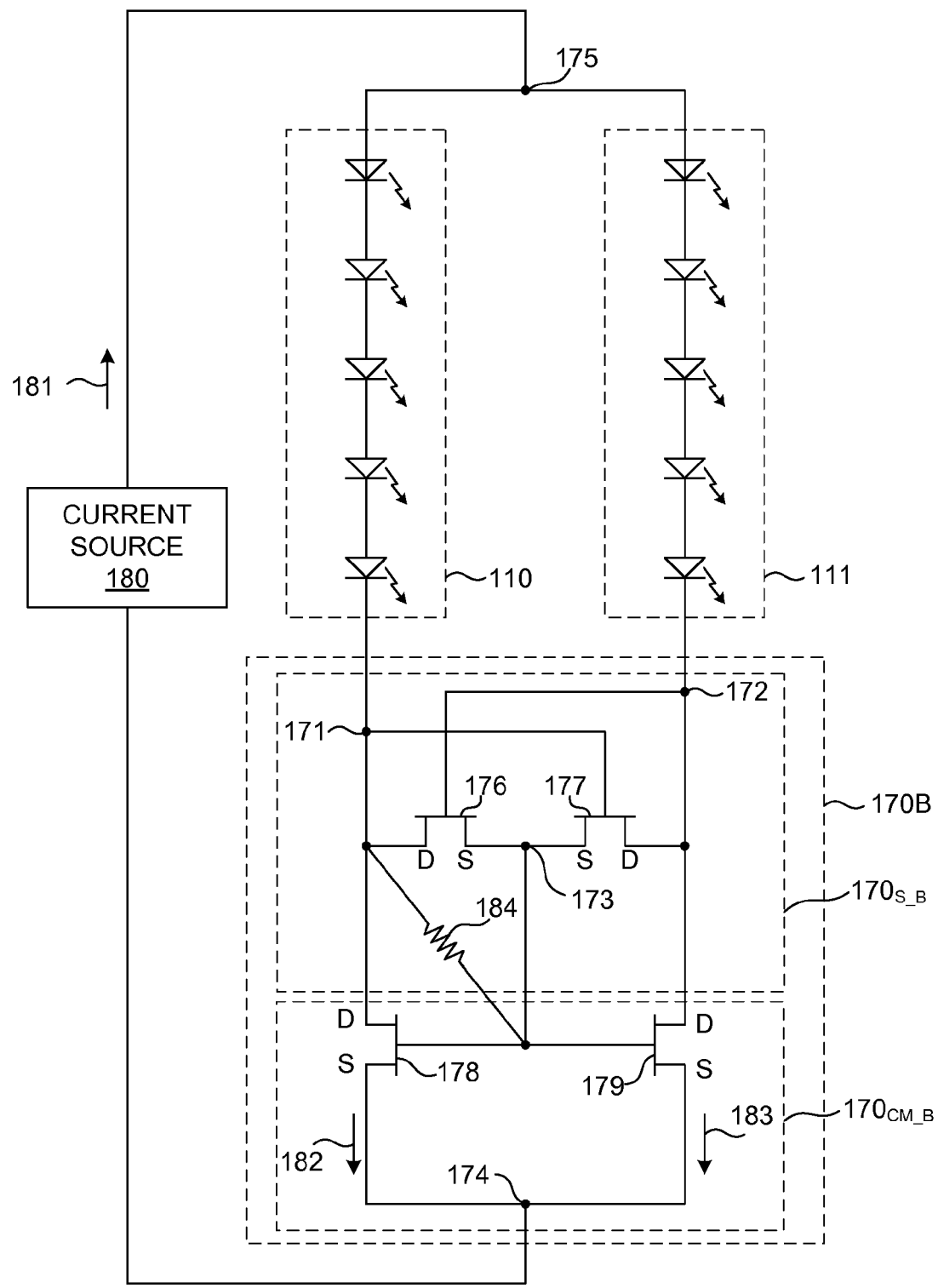
FIG. 8 illustrates another embodiment of variable master current mirror circuit.

FIG. 8 illustrates another embodiment of variable master current mirror circuit 170B with a switching circuit $170_{S\_B}$ and a current mirror circuit $170_{CM\_B}$. As illustrated in FIG. 8, the switching circuit $170_{S\_B}$ includes n-channel transistors 176 and 177 with transistor 176 having a drain coupled to node 171, a source coupled to node 173, and a gate coupled to node 172 and transistor 177 having a drain coupled to node 172, a source coupled to node 173 and a gate coupled to node 171. The current mirror circuit $170_{CM\_B}$ includes n-channel transistors 178 and 1797 with transistor 178 having a drain coupled to node 171, a source coupled to node 174, and a gate coupled to node 173 and transistor 179 having a drain coupled to node 172, a source coupled to node 174, and a gate coupled to node 173. A resistor 184 may be coupled between nodes 171 and 173.

In operation either node 171 or 172 is effectively coupled to node 173 based on the difference between a voltage at node 171 and node 172. As discussed hereinbefore, the voltage difference is indicative of which LED string has the larger forward voltage characteristic. In one example, the voltage at node 172 exceeds the voltage at node 171. Thus, the gate voltage on transistor 176 exceeds the drain voltage of transistor 176 and transistor 176 becomes substantially conductive, effectively coupling voltage node 171 to voltage node 173 and making LED string 110 the "master." In addition, the gate voltage on transistor 177 falls below the drain voltage of transistor 177 and transistor 177 becomes substantially non-conductive, effectively decoupling voltage node 172 from voltage node 173. Similarly, in another example, the voltage at node 171 exceeds the voltage at node 172. Thus, the gate voltage on transistor 177 exceeds the drain voltage of transistor 177 and transistor 177 becomes substantially conductive, effectively coupling voltage node 172 to voltage node 173 and making LED string 111 the "master." In addition, the gate voltage on transistor 176 falls below the drain voltage of transistor 176 and transistor 176 becomes substantially non-conductive, effectively decoupling voltage node 171 from voltage node 173. In this manner, the voltage difference between the voltage at node 171 and the voltage at node 172 determines which LED string acts as the "master." In this manner, variable master current mirror circuit 170B is configured such that the LED string with the larger forward voltage characteristic is always selected as the "master."

In addition, as illustrated in FIG. 8, resistor 184 is coupled to node 171 and node 173. In the illustrated embodiment, resistor 184 provides a stable start-up scenario. The resistor may couple to node 172 and node 173 to achieve the same objective. In other embodiments, other stabilizing circuits may be contemplated to ensure reliable start-up of variable master current mirror circuit 170B. In some other embodiments, resistor 184 may be omitted.

The embodiment illustrated in FIG. 8 omits comparator 169 compared to the embodiment illustrated in FIG. 7. The embodiments of FIG. 7 and FIG. 8 both exhibit variable master current mirror functionality as described herein. However, in some embodiments, including comparator 169 to drive the gate voltage of transistors 176 and 177 reduces the energy consumption of variable master current mirror circuit 170. In addition, in some embodiments, comparator 169 provides increased sensitivity to voltage differences between LED string 110 and 111, thereby increasing the precision of the current balance between the LED strings.

Figure 9:
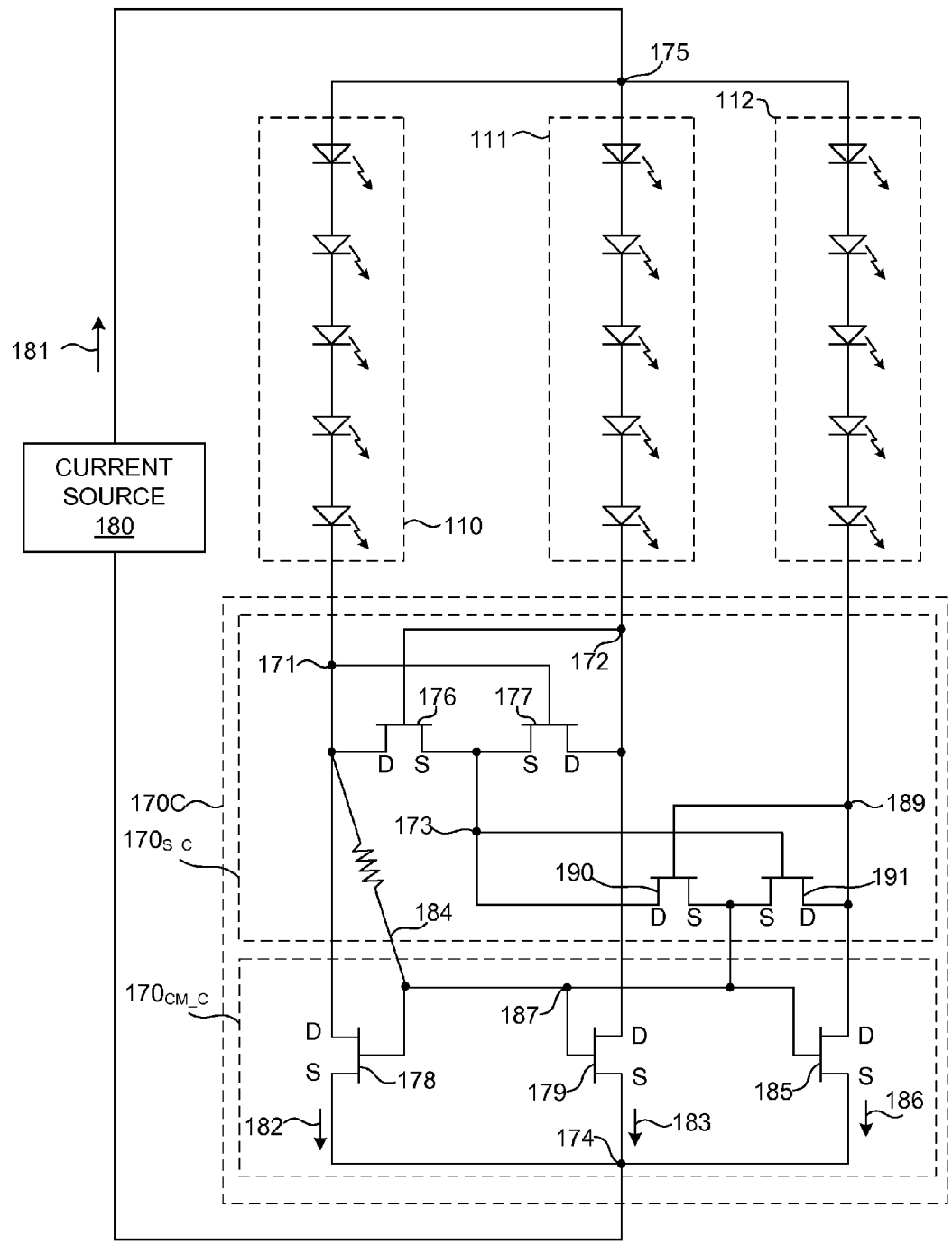
FIG. 9 illustrates an embodiment of a variable master current mirror circuit that balances current among three parallel LED strings.

The embodiments of FIGS. 7 and 8 depict current balancing between two LED strings. However, the embodiments can be extended to provide variable master current mirror functionality to more than two LED strings. By way of example, FIG. 9 illustrates a variable master current mirror circuit 170C that balances current among three LED strings 110-112, all of which are coupled to node 175 using a switching circuit $170_{S\_C}$ and a current mirror circuit $170_{CM\_C}$. As discussed hereinbefore with reference to FIG. 7, switching circuit $170_{S\_C}$ includes transistors 176 and 177 that function to couple either voltage node 171 or 172 to voltage node 173 depending on whether LED string 110 or 111 exhibits the largest forward voltage. Similarly, as illustrated in FIG. 9, switching circuit $170_{S\_C}$ includes transistors 190 and 191 that function to couple either voltage node 189 or voltage node 173 to voltage node 187 depending on whether the forward voltage of LED string 112 exceeds the larger forward voltage of LED strings 110 and 111. Voltage node 187 is coupled to matched transistors 178, 179, and 185 in the current mirror circuit $170_{CM\_C}$. In this manner, the LED string that exhibits the greatest forward voltage is the "master." Analogously, the embodiment illustrated in FIG. 9 may be extended to an arbitrary number of LED strings arranged in parallel. In addition, the switching circuit $170_{S\_C}$ may include a comparator with voltage nodes 171 and 172 as inputs and the gates of transistors 176 and 177 as outputs in the manner described hereinbefore with respect to FIG. 7. Similarly, a comparator may be added with voltage nodes 173 and 189 as inputs and the gates of transistors 190 and 191 as outputs. In this manner, the advantages associated with the use of comparators as described hereinbefore may be realized in a variable master current mirror circuit 170 coupled to more than two LED strings.

Figure 10:
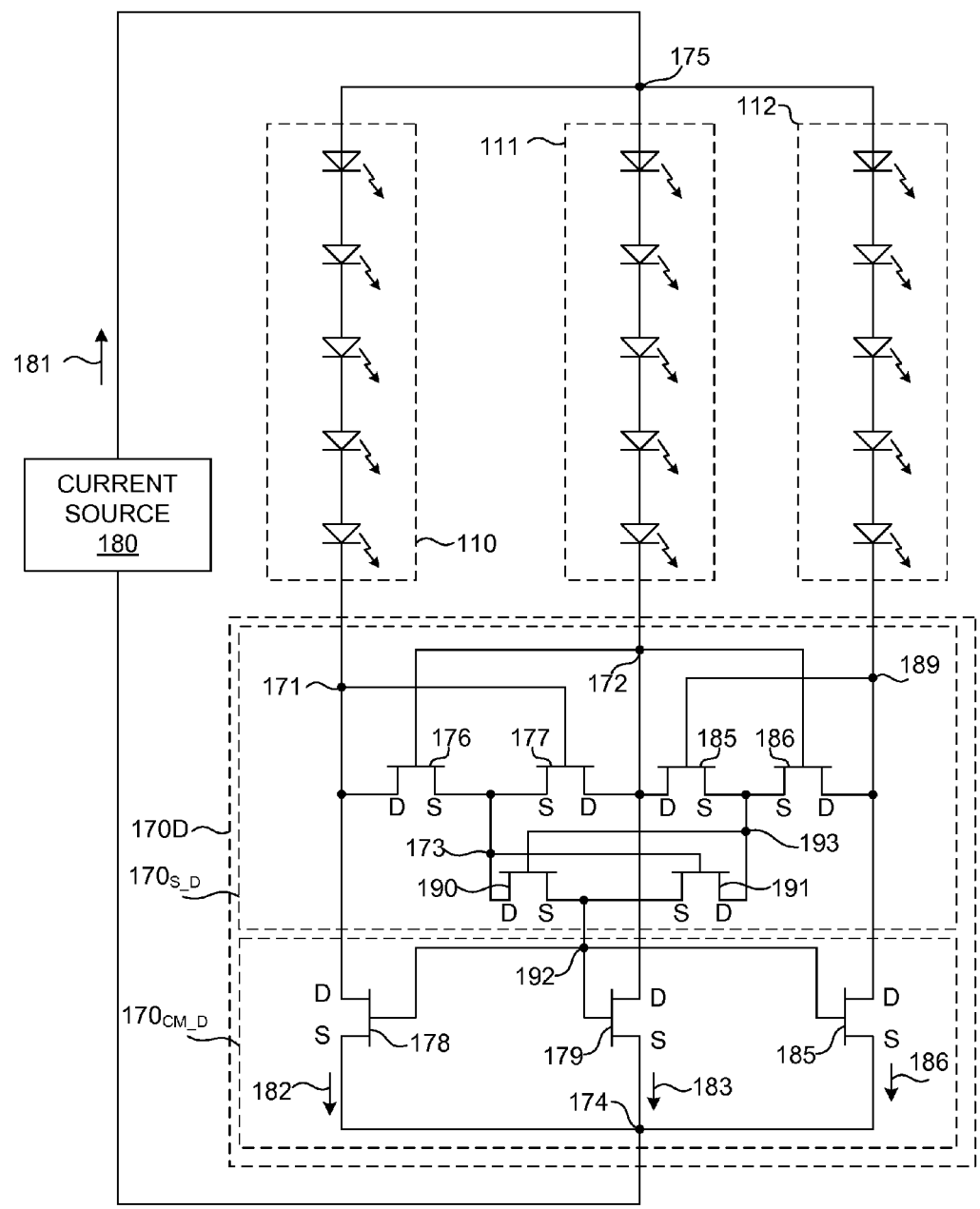
FIG. 10 illustrates another embodiment of a variable master current mirror circuit that balances current among three parallel LED strings.

FIG. 10 illustrates a variable master current mirror circuit 170D in another embodiment that balances current among three LED strings 110-112, which are coupled to node 175 using a switching circuit $170_{S\_D}$ and a current mirror circuit $170_{CM\_D}$. As discussed hereinbefore with reference to FIG. 7, transistors 176 and 177 in switching circuit $170_{S\_D}$ function to couple either voltage node 171 or 172 to voltage node 173 depending on whether LED string 110 or 111 exhibits the largest forward voltage. Similarly, as illustrated in FIG. 10, transistors 185 and 186 in switching circuit $170_{S\_D}$ function to couple either voltage node 189 or voltage node 172 to voltage node 193 depending on whether the forward voltage of LED string 112 exceeds the forward voltage of LED string 111. In addition, transistors 190 and 191 in switching circuit $170_{S\_D}$ function to couple either voltage node 173 or voltage node 193 to voltage node 192 depending on whether the larger of the forward voltages of LED strings 110 and 111 exceeds the larger of the forward voltages of LED strings 111 and 112. Voltage node 192 is coupled to matched transistors 178, 179, and 185 in the current mirror circuit $170_{CM\_D}$. In this manner, the LED string that exhibits the greatest forward voltage is the "master." Analogously, the embodiment illustrated in FIG. 10 may be extended to an arbitrary number of LED strings arranged in parallel. In addition, the switching circuit $170_{S\_D}$ may include a comparator with voltage nodes 171 and 172 as inputs and the gates of transistors 176 and 177 as outputs in the manner described hereinbefore with respect to FIG. 7. Similarly, a comparator may be added with voltage nodes 172 and 189 as inputs and the gates of transistors 185 and 186 as outputs. Also, a comparator may be added with voltage nodes 173 and 193 as inputs and the gates of transistors 190 and 191 as outputs. In this manner, the advantages associated with the use of comparators as described hereinbefore may be realized in a variable master current mirror circuit 170 coupled to more than two LED strings.

Figure 11:
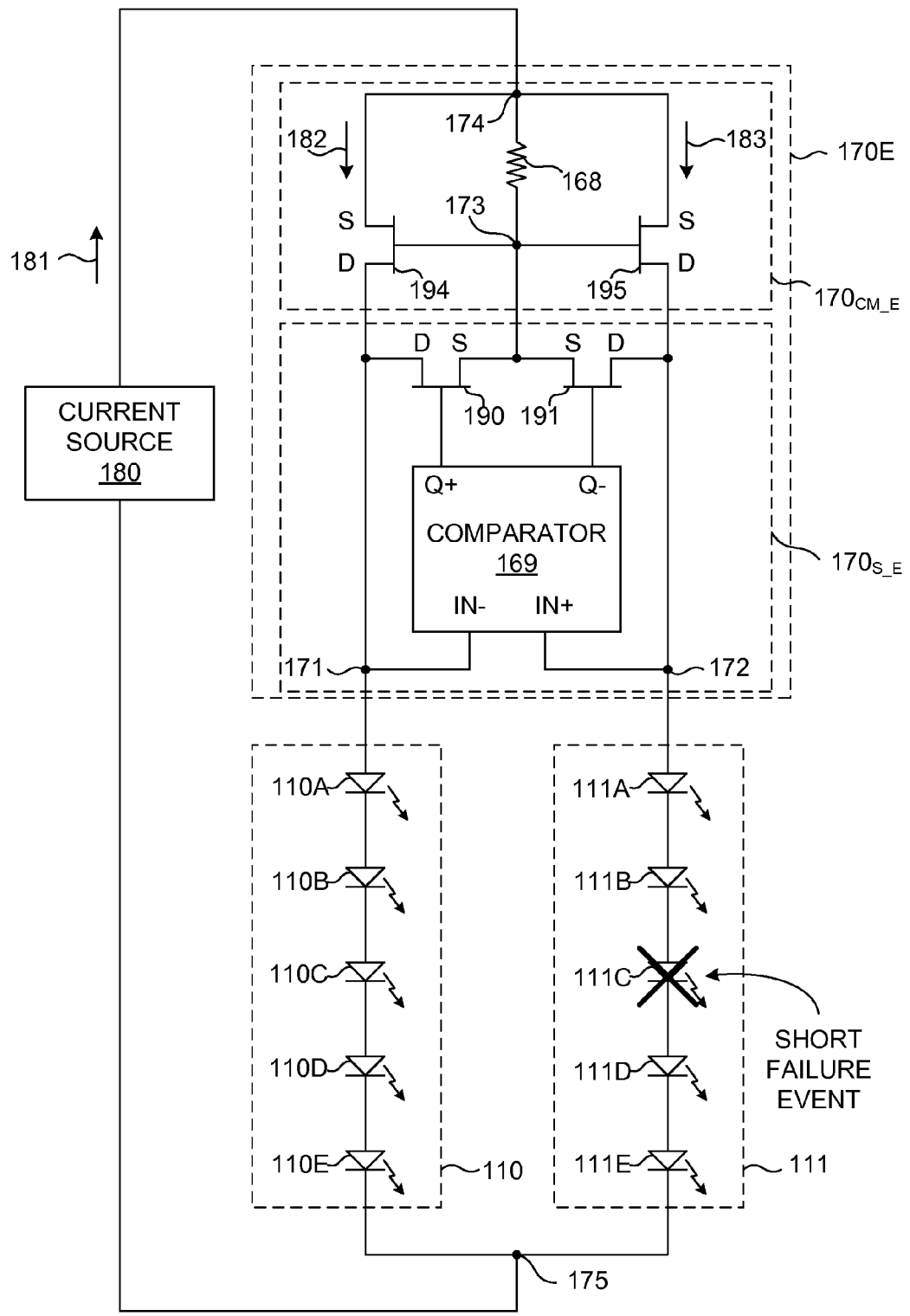
FIG. 11 illustrates another embodiment of variable master current mirror circuit

FIG. 11 is illustrative of variable master current mirror circuit 170E with a switching circuit $170_{S\_E}$ and current mirror circuit $170_{CM\_E}$ in another embodiment. As illustrated in FIG. 11, switching circuit $170_{S\_E}$ includes p-channel transistors 190, 191 and a comparator 169. Comparator 169 includes two input nodes (IN+ and IN-) and two output nodes (Q+ and Q-). Transistor 190 includes a drain coupled to node 171, a source coupled to node 173, and a gate coupled to output Q+ of comparator 169. Transistor 191 includes a drain coupled to node 172, a source coupled to node 173 and a gate coupled to output Q- of comparator 169. The current mirror circuit $170_{CM\_E}$ includes p-channel transistors 194, 195, with transistor 194 having a drain coupled to node 171, a source coupled to node 174, and a gate coupled to node 173 and transistor 195 having a drain coupled to node 172, a source coupled to node 174, and a gate coupled to node 173. A resistor 168 may be coupled to nodes 173 and 174.

In operation comparator 169 determines a voltage difference between a voltage at node 171 and node 172. The voltage difference is indicative of which LED string has the larger forward voltage characteristic. For example, in the configuration illustrated in FIG. 11, if the voltage at node 171 is greater than the voltage at node 172, this would indicate that the forward voltage across LED string 110 is greater than the forward voltage across LED string 111 since both LED string 110 and 111 are coupled together at node 175. Based on the voltage difference between nodes 171 and 172, comparator 169 generates the output Q+ and output Q- coupled to the gates of transistors 190 and 191, respectively. In one example, comparator 169 determines that the voltage at node 171 exceeds the voltage at node 172. Based on this determination, comparator 169 generates a low voltage (i.e., voltage near the negative rail) at output Q+. In response, transistor 190 becomes substantially conductive, effectively coupling voltage node 171 to voltage node 173 and making LED string 110 the "master." In addition, comparator 169 generates a high voltage (i.e., voltage near the positive rail) at the output Q-. In response, transistor 191 becomes substantially non-conductive, effectively decoupling voltage node 172 from node 173 and ensuring that LED string 111 is not the "master." Transistors 190 and 191 are configured in a current mirror configuration with LED string 110 as "master" when node 173 is coupled to node 171 and with LED string 111 as "master" when node 173 is coupled to node 172. In this manner, the voltage difference detected by comparator 169 determines which LED string acts as the "master." Furthermore, variable master current mirror circuit 170 is configured such that the LED string with the larger forward voltage characteristic is always selected as the "master."

As illustrated in FIGS. 7 and 11, the variable master current mirror circuit may be constructed from either n-channel or p-channel transistors, respectively. In some embodiments, the variable master current mirror circuit may be constructed from a combination of n-channel and p-channel transistors. In addition, different transistor types may be employed (e.g., field effect transistors, junction gate field effect transistors, bipolar junction transistors, etc.). However, in some embodiments it is preferable to employ n-channel field effect transistors (FETs). N-channel FETs exhibit very low resistance when in a substantially conductive state. In this manner, power consumed during operation is minimized.

Elements of the illustrated embodiments of the variable master current mirror circuit may be incorporated into any number of single or multi-chip implementations. Furthermore, elements of variable master current mirror circuits may be incorporated into any of an LED based illumination module 100 and current source 180.

Figure 12:
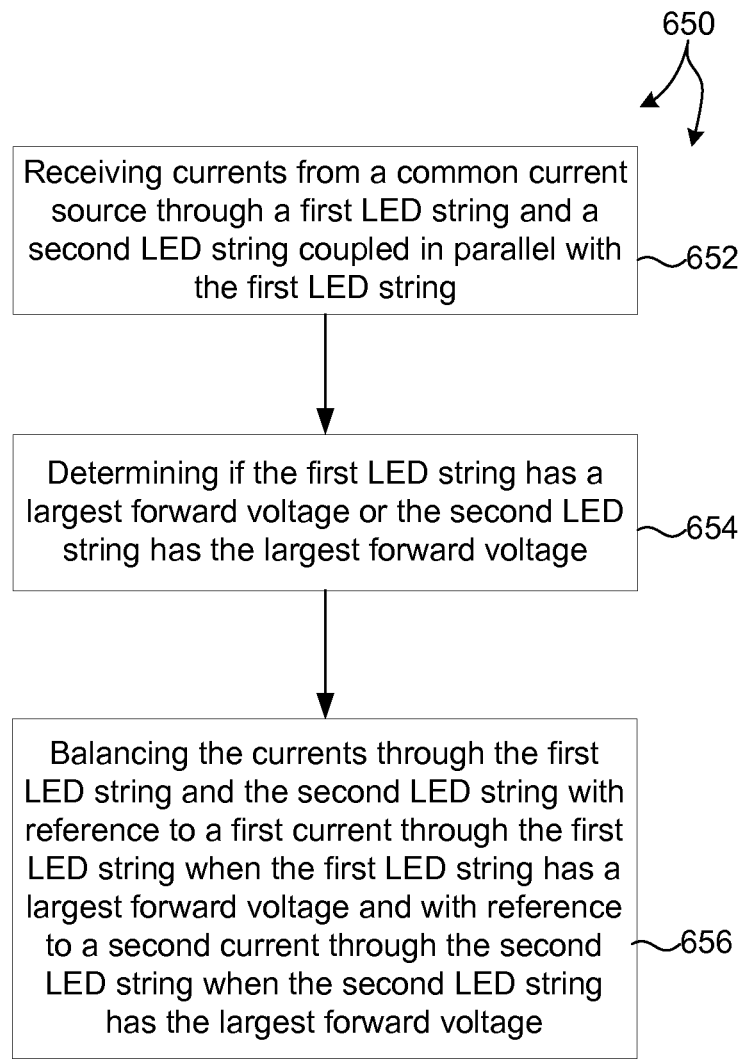
FIG. 12 illustrates a method of controlling current through parallel LED strings.

FIG. 12 illustrates an embodiment of a method 650 of controlling current through LED strings connected in parallel to a common current source. In block 652 currents are received from a common current source through a first LED string and a second LED string coupled in parallel with the first LED string. In block 654, it is determined if the first LED string has a largest forward voltage or the second LED string has the largest forward voltage. Determining if the first LED string has the largest forward voltage or the second LED string has the largest forward voltage may include comparing output signals, such as the forward voltage, of the first LED string and the second LED string. Comparing the output signals may be performed with a comparator circuit or with a first transistor having a drain coupled to the first LED string, a source and a gate coupled to the second LED string and a second transistor having a drain coupled to the second LED string, a source coupled to the source of the first transistor, and a gate coupled to the first LED string.

In block 656, the currents through the first LED string and the second LED string are balanced with reference to a first current through the first LED string when the first LED string has a largest forward voltage and with reference to a second current through the second LED string when the second LED string has the largest forward voltage. Balancing the currents may be performed by dividing the current from the common current source equally between the first LED string and the second LED string. Balancing the currents may comprise switchably connecting the first LED string to a current mirror circuit as a master LED string when the first LED string has the largest forward voltage and switchably connecting the second LED string to the current mirror circuit as the master LED string when the second LED string has the largest forward voltage and the current mirror circuit balances the currents through the first LED string and the second LED string with reference to a current through the master LED string.

Figure 13:
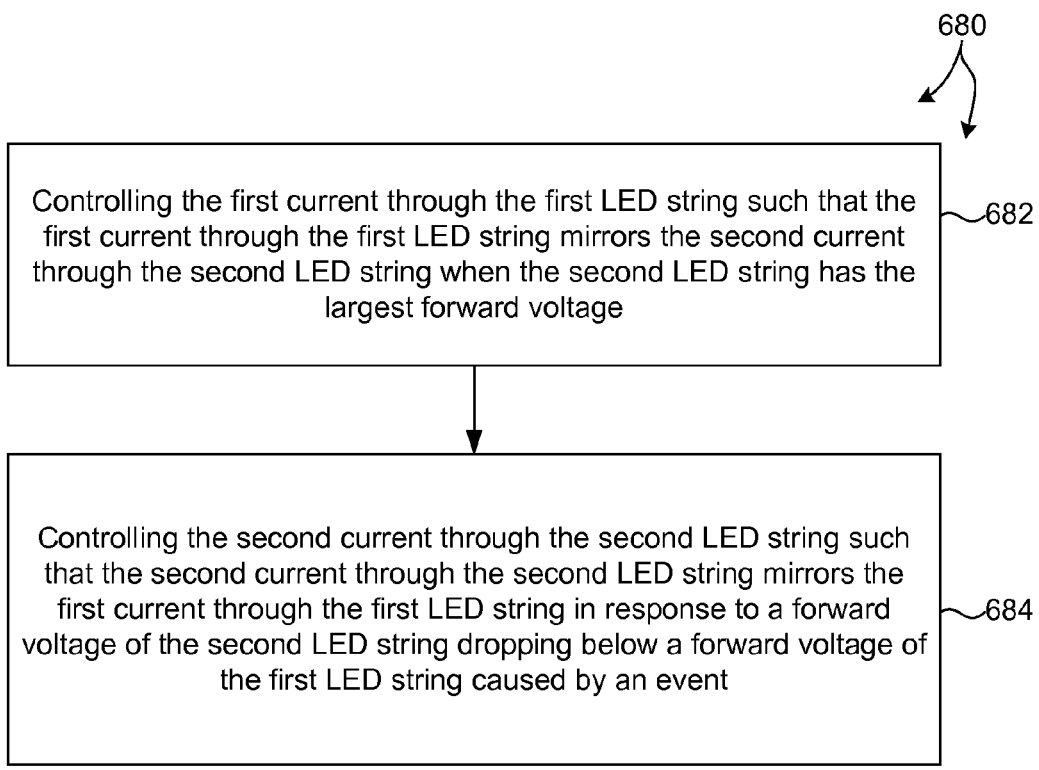
FIG. 13 is illustrative of a method of balancing the currents through the parallel LED strings.

FIG. 13 is illustrative of a method 680 of balancing the currents through the LED strings connected in parallel. In block 682, the first current through the first LED string is controlled such that the first current through the first LED string mirrors the second current through the second LED string when the second LED string has the largest forward voltage. In block 684, the second current through the second LED string is controlled such that the second current through the second LED string mirrors the first current through the first LED string in response to a forward voltage of the second LED string dropping below a forward voltage of the first LED string caused by an event. By way of example, the event may be a short failure of an LED of the second LED string.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A light emitting diode (LED) based illumination device, comprising:
   a first LED string including a first plurality of LEDs coupled in series;
   a second LED string including a second plurality of LEDs coupled in series;
   a current source coupled to the first LED string and the second LED string; and
   a variable master current minor circuit comprising a switching circuit coupled to the first LED string and the second LED string and a current minor circuit coupled between the switching circuit and the current source, wherein the switching circuit switchably connects the first LED string to the current minor circuit as a master LED string when the first LED string has a largest forward voltage and connects the second LED string to the current minor circuit as the master LED string when the second LED string has the largest forward voltage and the current mirror circuit maintains equal currents through the first LED string and the second LED string with reference to a current through the master LED string;
   wherein the switching circuit comprises:
      a first transistor having a drain coupled to the first LED string, a source and a gate;
      a second transistor having a drain coupled to the second LED string, a source coupled to the source of the first transistor, and a gate;
   wherein the current minor circuit comprises:
      a third transistor having a drain coupled to the drain of the first transistor, a source, and a gate; and
      a fourth transistor having a drain coupled to the drain of the second transistor, a source coupled to the source of the third transistor, and a gate coupled to the gate of the third transistor;
   wherein the gate of the first transistor is coupled to the second LED string, the gate of the second transistor is coupled to the first LED string, and the source of the third transistor is coupled to the current source.

2. The LED based illumination device of claim 1, wherein the first LED string has the largest forward voltage after a short failure event of an LED in the second LED string.

3. The LED based illumination device of claim 1, further comprising:
   a third LED string including a third plurality of LEDs coupled in series, the third LED string coupled to the current source and the switching circuit, wherein the switching circuit switchably connects the third LED string to the current mirror circuit as the master LED string when the third LED string has the largest forward voltage and the current minor circuit maintains equal currents through the first LED string, the second LED string and the third LED string with reference to the current through the master LED string.

4. The LED based illumination device of claim 3, wherein the switching circuit comprises:
   a first transistor having a drain coupled to the first LED string, a source and a gate;
   a second transistor having a drain coupled to the second LED string, a source coupled to the source of the first transistor, and a gate;
   a third transistor having a drain coupled to the source of the first transistor, a source, and a gate coupled to the third LED string;
   a fourth transistor having a drain coupled to the third LED string, a source coupled to the source of the third transistor, and a gate coupled to the source of the first transistor;
   wherein the current minor circuit comprises:
   a fifth transistor having a drain coupled to the drain of the first transistor, a source, and a gate; and
   a sixth transistor having a drain coupled to the drain of the second transistor, a source coupled to the source of the fifth transistor, and a gate coupled to the gate of the third transistor; and
   a seventh transistor having a drain coupled to the third LED string, a source coupled to the source of the fifth transistor, and a gate coupled to the source of the third transistor and the gate of the fifth transistor.

5. The LED based illumination device of claim 1, wherein the first, second, third, and fourth transistors are n-channel field effect transistors.

6. A variable master current minor circuit, comprising:
   a first transistor having a drain coupleable to a first LED string, a source and a gate;
   a second transistor having a drain coupleable to a second LED string, a source coupled to the source of the first transistor, and a gate;
   a third transistor having a drain coupled to the drain of the first transistor, a source, and a gate coupled to the source of the first transistor;
   a fourth transistor having a drain coupled to the drain of the second transistor, a source coupled to the source of the third transistor, and a gate coupled to the source of the first transistor; and
   a comparator having an inverting input node coupled to the drain of the first transistor, an input node coupled to the drain of the second transistor, an output node coupled to the gate of the first transistor, and an inverting output node coupled to the gate of the second transistor.

7. The variable master current minor circuit of claim 6, further comprising a resistor coupled between the gate and the drain of the third transistor.

8. The variable master current minor circuit of claim 6, wherein a current source is coupleable to the source of the third transistor.

9. A method comprising:
receiving currents from a common current source through a first LED string and a second LED string coupled in parallel with the first LED string;
determining if the first LED string has a largest forward voltage or the second LED string has the largest forward voltage; and
balancing the currents through the first LED string and the second LED string with reference to a first current through the first LED string when the first LED string has the largest forward voltage and with reference to a second current through the second LED string when the second LED string has the largest forward voltage;
wherein determining if the first LED string has the largest forward voltage or the second LED string has the largest forward voltage comprises comparing an output signal of the first LED string with an output signal of the second LED string;
wherein comparing an output signal of the first LED string with an output signal of the second LED string is performed with:
a first transistor having a drain coupled to the first LED string, a source and a gate coupled to the second LED string; and
a second transistor having a drain coupled to the second LED string, a source coupled to the source of the first transistor, and a gate coupled to the first LED string.

10. The method of claim 9, wherein the balancing the currents comprises dividing a current from the common current source equally between the first LED string and the second LED string.

11. The method of claim 9, wherein the balancing currents comprises:
controlling the first current through the first LED string such that the first current through the first LED string mirrors the second current through the second LED string when the second LED string has the largest forward voltage; and
controlling the second current through the second LED string such that the second current through the second LED string mirrors the first current through the first LED string in response to a forward voltage of the second LED string dropping below a forward voltage of the first LED string caused by an event.

12. The method of claim 11, wherein the event is a short failure of an LED of the second LED string.

13. The method of claim 9, wherein the balancing the currents comprises:
switchably connecting the first LED string to a current mirror circuit as a master LED string when the first LED string has the largest forward voltage and switchably connecting the second LED string to the current minor circuit as the master LED string when the second LED string has the largest forward voltage and the current minor circuit balances the currents through the first LED string and the second LED string with reference to a current through the master LED string.

14. A method comprising:
receiving currents from a common current source through a first LED string and a second LED string coupled in parallel with the first LED string;
determining if the first LED string has a largest forward voltage or the second LED string has the largest forward voltage; and
balancing the currents through the first LED string and the second LED string with reference to a first current through the first LED string when the first LED string has the largest forward voltage and with reference to a second current through the second LED string when the second LED string has the largest forward voltage;
wherein determining if the first LED string has the largest forward voltage or the second LED string has the largest forward voltage comprises comparing an output signal of the first LED string with an output signal of the second LED string;
wherein comparing an output signal of the first LED string with an output signal of the second LED string is performed with a comparator circuit having an inverting input node coupled to the first LED string, an input node coupled to the second LED string, an output node coupled to control a first current in the first LED string, and an inverting output node coupled to control a second current in the second LED string.

\* \* \* \* \*